US012492809B2

(12) United States Patent
Leung

(10) Patent No.: US 12,492,809 B2
(45) Date of Patent: Dec. 9, 2025

(54) LED LIGHT STRING WITH TRANSPARENT AND OPAQUE COATINGS

(71) Applicant: Belgravia Wood Limited, Hong Kong (HK)

(72) Inventor: Chi Yin Alan Leung, Apleichau (HK)

(73) Assignee: Belgravia Wood Limited, Hong Kong (HK)

( * ) Notice: Subject to any disclaimer, the term of this patent is extended or adjusted under 35 U.S.C. 154(b) by 0 days.

(21) Appl. No.: 18/321,345

(22) Filed: May 22, 2023

(65) Prior Publication Data

US 2023/0288050 A1 Sep. 14, 2023

Related U.S. Application Data

(63) Continuation of application No. 17/062,902, filed on Oct. 5, 2020, now Pat. No. 11,686,460.

(51) Int. Cl.
*F21V 23/00* (2015.01)
*H01B 13/32* (2006.01)
*F21Y 115/10* (2016.01)

(52) U.S. Cl.
CPC .......... *F21V 23/001* (2013.01); *H01B 13/32* (2013.01); *F21Y 2115/10* (2016.08)

(58) Field of Classification Search
CPC ... F21V 23/001; H01B 13/32; F21Y 2115/10; F21S 4/10
See application file for complete search history.

(56) References Cited

U.S. PATENT DOCUMENTS 2,188,529 A 1/1940 Corina
3,970,834 A 7/1976 Smith
(Continued)

FOREIGN PATENT DOCUMENTS

CN 1181693 A 5/1998
CN 2456593 Y 10/2001
(Continued)

OTHER PUBLICATIONS

International Search Report and Written Opinion in PCT Application No. PCT/IB2021/059088 dated Jan. 5, 2022 (15 pages).
(Continued)

*Primary Examiner* — Ismael Negron
(74) *Attorney, Agent, or Firm* — GREENBERG TRAURIG LLP

(57) ABSTRACT

A lighting apparatus can include a first component wire, a second component wire, a return wire, and a plurality of light emitting diodes (LEDs). A first respective end of the first component wire and the second component wire are electrically connected. The first component wire and the second component each include a plurality of breaks, dividing each one of the component wires into individual segments. A second respective end of the first component wire, the second component wire, and the return wire are electrically interconnected. The plurality of diodes may be connected to the first component wire and the second component wire at periodic distances. An at least partially translucent insulating thermoset polymer is provided as a coating over the plurality of LEDs. An opaque insulating material covers the first component wire, the second component wire, and the return wire, except those portions including an LED.

15 Claims, 6 Drawing Sheets

(56) References Cited

U.S. PATENT DOCUMENTS

| | | | | |
|---|---|---|---|---|
| 4,855,880 | A | 8/1989 | Mancusi Jr. | |
| 4,899,266 | A * | 2/1990 | Ahroni | F21S 4/10 362/249.14 |
| 5,550,720 | A | 8/1996 | Carroll | |
| 5,855,705 | A | 1/1999 | Gauthier | |
| 6,056,427 | A | 5/2000 | Kao | |
| 6,228,442 | B1 * | 5/2001 | Coco | F21S 4/10 362/431 |
| 6,588,914 | B1 | 7/2003 | Tang | |
| 6,914,194 | B2 * | 7/2005 | Fan | F21S 4/24 174/117 F |
| 8,053,042 | B1 | 11/2011 | Loomis | |
| 8,567,992 | B2 * | 10/2013 | Lo | H05B 47/18 362/267 |
| 9,466,776 | B1 | 10/2016 | Hsu | |
| 9,894,949 | B1 | 2/2018 | Chen | |
| 10,028,360 | B1 | 7/2018 | Chen | |
| 10,205,073 | B2 * | 2/2019 | Altamura | H10H 20/857 |
| 10,288,235 | B1 * | 5/2019 | Chen | F21V 19/005 |
| 10,982,828 | B1 | 4/2021 | Chen | |
| 11,049,849 | B2 | 6/2021 | Kleijnen et al. | |
| 11,421,834 | B1 | 8/2022 | Yin | |
| 11,686,460 | B2 * | 6/2023 | Leung | F21S 4/10 362/249.01 |
| 2003/0193803 | A1 | 10/2003 | Lin | |
| 2005/0024871 | A1 | 2/2005 | Wu | |
| 2011/0228535 | A1 | 9/2011 | Shao | |
| 2013/0155713 | A1 * | 6/2013 | Law | F21S 45/10 362/545 |
| 2013/0313988 | A1 * | 11/2013 | McRae | H05B 45/00 315/193 |
| 2016/0360914 | A1 | 12/2016 | Austin et al. | |
| 2017/0299133 | A1 * | 10/2017 | Kuo | F21V 15/01 |
| 2018/0187840 | A1 * | 7/2018 | Chen | F21S 4/10 |
| 2019/0277458 | A1 * | 9/2019 | Shao | F21S 4/26 |
| 2020/0278091 | A1 * | 9/2020 | Chen | F21S 4/10 |
| 2020/0386391 | A1 | 12/2020 | He | |
| 2021/0071827 | A1 * | 3/2021 | Shan | F21K 9/90 |
| 2021/0071850 | A1 * | 3/2021 | Shan | F21V 17/16 |

FOREIGN PATENT DOCUMENTS

| | | | |
|---|---|---|---|
| CN | 2516808 | Y | 10/2002 |
| CN | 2707536 | Y | 7/2005 |
| CN | 2738090 | Y | 11/2005 |
| CN | 2754502 | Y | 2/2006 |
| CN | 2859192 | Y | 1/2007 |
| CN | 201905696 | U | 7/2011 |
| CN | 202775756 | U | 3/2013 |
| CN | 103783984 | A | 5/2014 |
| CN | 203656691 | U | 6/2014 |
| CN | 204477773 | U | 7/2015 |
| CN | 110617414 | A | 12/2019 |
| CN | 209856829 | U | 12/2019 |
| CN | 211146156 | U | 7/2020 |
| JP | 2017069401 | A * | 4/2017 |
| TW | 308488 | U | 3/2007 |

OTHER PUBLICATIONS

English Translation of JP-2017069401-A; Substrate and Light Emitting Device, and Method of Manufacturing Light Emitting Device, Hosoya; (Year: 2017).

* cited by examiner

500

LED LIGHT STRING WITH TRANSPARENT AND OPAQUE COATINGS

CROSS REFERENCES TO RELATED APPLICATIONS

This application is continuation of U.S. patent application Ser. No. 17/062,902, filed on Oct. 5, 2020. The entire contents of the above-referenced application are incorporated herein by reference.

TECHNICAL FIELD

The subject matter described herein generally relates to improving lighting wiring apparatuses. For example, certain disclosed embodiments are directed to an apparatus having diodes wired three wires having intermediate breaks. Embodiments also include methods for creating a wired-diode apparatus using wire-cutting and wire-coating techniques.

BACKGROUND

Modern lighting apparatuses suffer from many aspects that make them difficult to manufacture in a cost-effective manner that simultaneously is not prone to defects. For example, some current apparatuses use weak coatings, due to a poor coating composition or a poor coating thickness. Many current techniques for making lighting strings (e.g., wired lights for holiday and other celebratory purposes) involve complex and cost-intensive multi-stage processes, such as stages for installing threaded components to lighting strings and screwing lighting bulbs into the threaded components. In some cases, processes may involve significant amounts of manual human labor.

In many cases, lighting bulbs used in lighting strings are made of fragile materials such as glass and contain thin filaments, all of which are easily susceptible to damage or breaking. Even in lighting strings without these components, current variants still include components that can become damaged from twisting, tossing, pulling, bending, re-bending, and other human interactions with the lighting strings. Some current techniques use loose copper return wires, which can be prone to tangling.

In view of the technical deficiencies of current systems, there is a need for lighting apparatuses that are easily and cost-effectively manufacturable while having few if any defects. For example, wiring apparatuses with particular structures and compositions, such as coated wires and coated diodes, may be easier and less costly to manufacture while remaining durable. Moreover, particular processes involving breaking wires and two types of coatings may allow for streamlined production with reduced defects.

SUMMARY

Certain embodiments describe an apparatus for providing light. In some embodiments, the apparatus may have a first end and a second end. In some embodiments, the apparatus may comprise three wires extending along a similar direction. The three wires may comprise a first component wire, a second component wire, and a return wire. In some embodiments, each of the three wires may have a first and second predominantly terminal section; the first predominantly terminal section of the first component wire may be connected to the first predominantly terminal section of the second component wire near the first end of the apparatus; the second predominantly terminal sections of the three wires may be connected near the second end of the apparatus; and a plurality of diodes may be connected to the first component wire and the second component wire at periodic distances.

In accordance with further embodiments, the diodes may be light-emitting diodes (LEDs).

In accordance with further embodiments, the diodes may be surface mount technology (SMT) LEDs.

In accordance with further embodiments, the first and second component wires may have breaks at periodic distances along the apparatus.

In accordance with further embodiments, a polarity of the diodes may change at periodic distances along the apparatus.

In accordance with further embodiments, the plurality of diodes may be connected to the first and second component wires at connection points; the three wires may be coated in a first insulating material in segments not including the connection points; and the three wires and the plurality of diodes may be coated in a second insulating material at the connection points.

In accordance with further embodiments, the second insulating material may be at least partially translucent.

In accordance with further embodiments, the second insulating material may be an epoxy.

In accordance with further embodiments, the first insulating material may be opaque.

In accordance with further embodiments, the first insulating material may be green.

In accordance with further embodiments, the first insulating material may be covered with a green coating.

In accordance with further embodiments, the green coating may be a paint.

In accordance with further embodiments, the first insulating material may be a polyvinyl chloride (PVC) wire jacket.

In accordance with further embodiments, the three wires and plurality of diodes may be able to conduct electric current produced by an input voltage of approximately 29 volts of direct current.

In accordance with further embodiments, the apparatus may comprise an endpiece connected to the three wires near the first end of the apparatus, and the endpiece may be configured for connection with a wall outlet.

In accordance with further embodiments, the apparatus may comprise an alternating-current-to-direct-current (AC/DC) convertor.

Further disclosed embodiments include a method of creating a lighting apparatus. The method may comprise: enclosing segments of a first component wire, a second component wire, and a return wire in a first insulating material while leaving other segments unenclosed, each wire having first predominantly terminal section and a second predominantly terminal section; connecting the first predominantly terminal section of the first component wire to the first predominantly terminal section of the second component wire; connecting the second predominantly terminal section of the first component wire to the second predominantly terminal section of the second component wire; connecting the second predominantly terminal section of the first component wire to the second predominantly terminal section of the return wire; connecting at least one diode to at least one of the unenclosed segments of the first component wire and at least one of the unenclosed segments of the second component wire; and enclosing the at least one diode and the unenclosed segments at which the diode is connected in a second insulating material.

In accordance with further embodiments, connecting the first predominantly terminal section of the first component wire to the first predominantly terminal section of the second component wire may comprise soldering the first predominantly terminal section of the first component wire to the first predominantly terminal section of the second component wire; connecting the second predominantly terminal section of the first component wire to the second predominantly terminal section of the second component wire may comprise soldering the second predominantly terminal section of the first component wire to the second predominantly terminal section of the second component wire; connecting the second predominantly terminal section of the first component wire to the second predominantly terminal section of the return wire may comprise splicing the second predominantly terminal section of the first component wire to the second predominantly terminal section of the return wire; and connecting at least one diode to at least one of the unenclosed segments of the first component wire and at least one of the unenclosed segments of the second component wire may comprise soldering the at least one diode to: the at least one unenclosed segment of the first component wire and the at least one unenclosed segment of the second component wire.

In accordance with further embodiments, at least some of the soldering may be performed using SMT.

In accordance with further embodiments, the method may comprise creating breaks in the first and second component wires at periodic distances.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the components, materials, methods, and examples are illustrative only and are not intended to be necessarily limiting.

Figure 1:
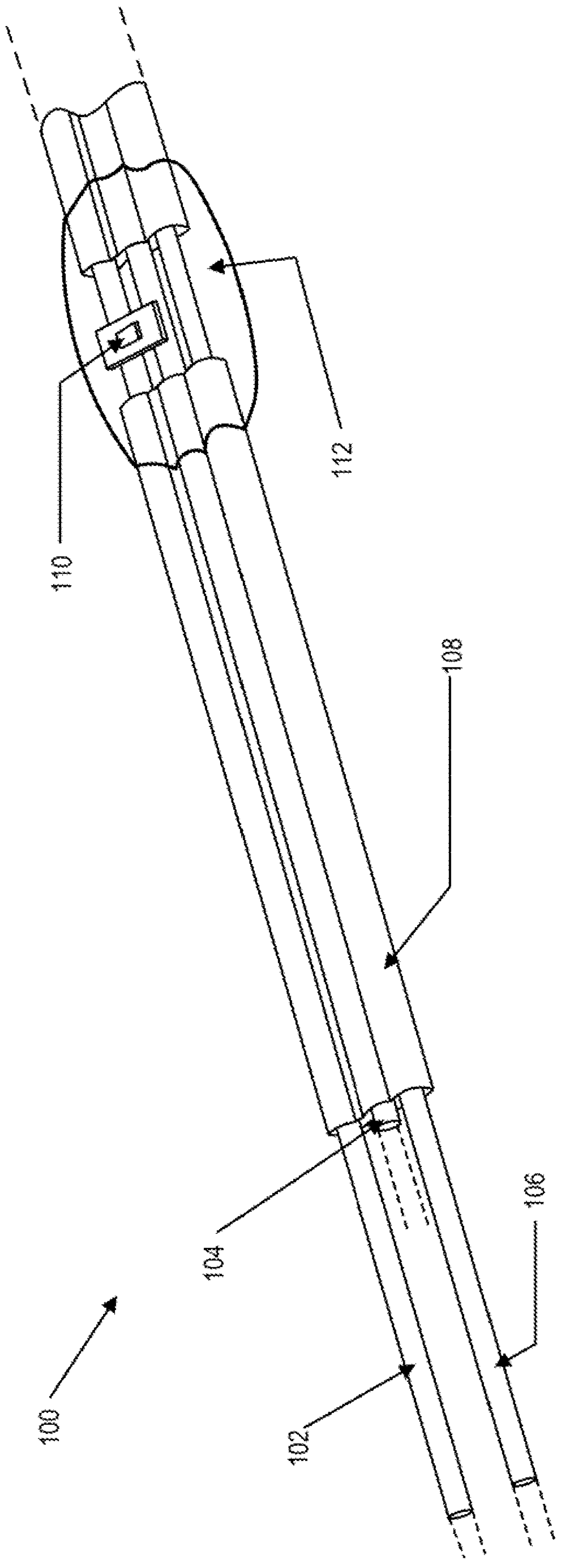
FIG. 1 illustrates an exemplary cut-away drawing of a segment of a wired lighting apparatus, consistent with disclosed embodiments.

FIG. 1 illustrates an exemplary drawing of a segment of a wired lighting apparatus 100, consistent with disclosed embodiments. In some embodiments, wired lighting apparatus 100 includes multiple segments, such as the segment shown in FIG. 1. In some embodiments, wired lighting apparatus 100 may include a first component wire 102, a second component wire 104, and a return wire 106. In some embodiments, first component wire 102 and second component wire 104 may connect various components, and return wire 106 may be a return wire for carrying current back to a source. In some embodiments, only one component wire may be used. Moreover, any number of wires and/or wire segments may be used to form wired lighting apparatus 100. First component wire 102, second component wire 104, and/or return wire 106 may be made of any combination of copper, aluminum, gold, platinum, iron, silver, brass, bronze, steel, and/or any other electrically conductive material. In some embodiments, first component wire 102, second component wire 104, and/or return wire 106 may be comprised of multiple strands, which may be twisted or braided together. In some embodiments, first component wire 102, second component wire 104, and/or return wire 106 may be able to conduct electric current produced by an input voltage of approximately 29 volts of direct current, or other current or voltage suitable for lighting.

In some embodiments, first component wire 102 and/or second component wire 104 may have a break (e.g., a portion of the wire that was removed, or never existed). The term wire may refer to either a single, unbroken wire, or a wire having breaks. In other words, a group of wire segments (e.g., a wire having breaks) may be considered the same wire for at least conceptual reference purposes, due to these segments having a similar position relative to other wires or wire segments while proceeding along the length of a lighting wiring apparatus (e.g., multiple segments of wire continuing along substantially the same path, having a similar position within an apparatus, etc.).

In some embodiments, first component wire 102, second component wire 104, and return wire 106 may be at least partially enclosed by an insulating material 108, which may constrain the wires to some degree, such that they may extend along a similar direction (e.g., in parallel, with positioning relative to each other preserved to a degree, following a pattern, etc.). For example, insulating material 108 may comprise a plastic coating or sheath, a nylon coating, a polyvinyl chloride (PVC) coating, a synthetic polymer coating, and/or any wire coating that insulates a wire from potential conductors. In some embodiments, insulating material 108 may be a mesh and/or may be elastic to a degree (even if not visibly elastic to the human eye), which may enhance durability. For example, insulating material 108 may comprise a PVC wire jacket. In some embodiments, insulating material 108 may be configured to substantially or completely electrically insulate current produced by an input voltage of approximately 29 volts of direct current, or other current or voltage suitable for lighting. Alternatively or additionally, insulating material 108 may be configured to substantially or completely thermally insulate current produced by an input voltage of approximately 29 volts of direct current, or other current or voltage suitable for lighting. In some embodiments, insulating material 108 may comprise multiple layers, which may be different compounds, epoxies, materials, etc.

In some embodiments, insulating material 108 may be opaque or substantially opaque. In some embodiments, insulating material 108 may have a particular color (e.g., green), which may be selected to match or agree with a color of an object to which wired lighting apparatus 100 may be attached (e.g., an artificial tree). In some embodiments, insulating material 108 may comprise multiple coatings, which may serve different purposes (e.g., insulating, providing a particular color to an observer, etc.). For example, insulating material 108 may comprise a first electrically-insulating coating, and a second coating (e.g., a paint, epoxy, plastic, etc.) having a particular color, which may cover the first coating.

In some embodiments, insulating material 108 may be formed such that it insulates first component wire 102, second component wire 104, and return wire 106 from each other. For example, insulating material 108 may have been formed to have three connected channels (e.g., within tubes, wiring coatings, etc.) for carrying and/or insulating wires. In other embodiments, insulating material 108 may comprise three separate coating tubes, which may remain separate, or which may be connected by means of weaving, braiding, twisting, gluing, taping, or other means of safely connecting insulated wires. In some embodiments, at least one wire may be coated in insulating material 108 on a portion of wired lighting apparatus 100 that does not include a connection point for a component (e.g., lighting component 110).

In some embodiments, wired lighting apparatus 100 may have an uncoated portion of at least one of first component wire 102, second component wire 104, and/or return wire 106. For example, in some embodiments, all three of first component wire 102, second component wire 104, and return wire 106 may be uncoated at a similar area of wired lighting apparatus 100. As another example, first component wire 102 and second component wire 104 may be uncoated at a similar area of wired lighting apparatus 100, but return wire 106 may be coated. Of course, other combinations of locations of coated and uncoated portions of wires are contemplated as well, and are well within the scope of the disclosed embodiments.

In some embodiments, a lighting component 110 may be attached at least one of first component wire 102 or second component wire 104 at a connection point. A connection point may be an uncovered (e.g., uncoated) portion of a wire, at which an electrical connection between the wire and a light component or other conducting element may be achieved. Lighting component 110 may be a diode (e.g., light-emitting diode, referred to as an LED), an incandescent light (e.g., an incandescent filament bulb), a light-emitting electrochemical cell, or any other component capable of emitting light (e.g., responsive to an electric current). In some embodiments, lighting component 110 may be connected to a wire by soldering and/or using surface mount technology (SMT). In some embodiments, lighting component 110 may be an SMT LED (e.g., an LED configured to connect to a wire using SMT). In some embodiments, lighting component may emit a particular color (e.g., white, yellow, green, red, blue, etc.) when an electric current is applied. In some embodiments, two or more lighting components 110 may be positioned near each other (e.g., encapsulated in a same portion coated with second insulating material 112, discussed below) and/or may emit two different colors, which may be perceived to a human eye as a third different color. In some embodiments, lighting component 110 may be able to conduct electric current produced by an input voltage of approximately 29 volts of direct current, or other current or voltage suitable for lighting.

In some embodiments, at least one wire and at least one diode may be coated in a second insulating material 112 at a connection point (e.g., an area where a lighting component 110 is connected to a wire). For example, lighting component 110 and/or an uncoated portion of wire may be coated with second insulating material 112, which may be at least partially translucent. In some embodiments, insulating material 112 may comprise a plastic coating or sheath, a nylon coating, a polyvinyl chloride coating, a synthetic polymer coating, an epoxy, or any other material that electrically insulates and is capable of transmitting, reflecting, and/or emitting light. For example, insulating material 112 may comprise a translucent epoxy (e.g., thermosetting polymer) encapsulation. In some embodiments, insulating material 112 may comprise an epoxy that is flexible to a degree, making wired lighting apparatus 100 durable and allowing it to bend without damaging, or allowing it to bend while negligibly damaging, insulating material 112. In some embodiments, insulating material 112 may be tinted or otherwise configured to alter the wavelength of light emitted from a lighting component 110. Thus, insulating material 112 may provide durability and flexibility to a wired lighting apparatus 100, while protecting a lighting component 110 and allowing it to transmit light to its surroundings.

In some embodiments, insulating material 112 may be configured to substantially or completely electrically insulate current produced by an input voltage of approximately 29 volts of direct current, or other current or voltage suitable for lighting. Alternatively or additionally, insulating material 112 may be configured to substantially or completely thermally insulate current produced by an input voltage of approximately 29 volts of direct current, or other current or voltage suitable for lighting. In some embodiments, insulating material 112 may comprise multiple layers, which may be different compounds, epoxies, materials, etc.

Figure 2:
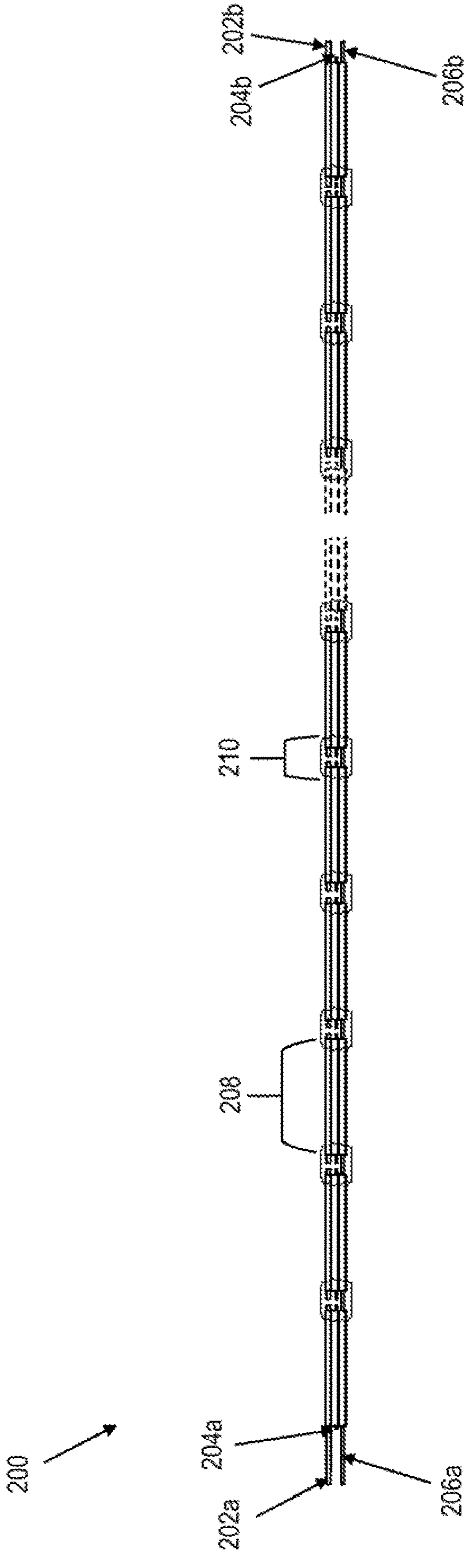
FIG. 2 illustrates an exemplary drawing of a wired lighting apparatus, consistent with disclosed embodiments.

FIG. 2 illustrates an exemplary drawings of a wired lighting apparatus 200, consistent with disclosed embodiments. In some embodiments, wired lighting apparatus 200 may comprise multiple segments, such as the segment shown in FIG. 1. For example, wired lighting apparatus 200 may include a first component wire (with or without breaks), a second component wire (with or without breaks), and/or a return wire. In some embodiments, lighting apparatus 200 may have a first component wire having a first predominantly terminal section 202*a* and a second predominantly terminal section 202*b*. Correspondingly, lighting apparatus 200 may have a second component wire having a first predominantly terminal section 204*a* and a second predominantly terminal section 204*b*, and may have a return wire having a first predominantly terminal section 206*a* and a second predominantly terminal section 206*b*. A predominantly terminal section of a wire may be an area of a wire past which no components, or no components of a particular type (e.g., an LED), are connected. Additionally or alternatively, a predominantly terminal section of a wire may be an area of a wire past which very little of the wire exists relative to the entire length of the wire (e.g., group of of wire segments, single continuous wire).

In some embodiments, a first predominantly terminal section of the first component wire may be connected to the first predominantly terminal section of the second component wire which may occur near the first end of lighting apparatus 200. Wires may be connected by splicing, soldering, and/or any other method of creating an electrical connection between wires. In some embodiments, these two sections may have been connected using an SMT LED lamp. In some embodiments, a segment of combined first predominantly terminal sections of the first and second component wires (which may be a portion of the first component wire itself, past which the second component does not continue in one direction, as shown in FIG. 2, which shows the first predominantly terminal section 202*a* of the first component wire terminating past, moving leftward, the first predominantly terminal section 204*a* of the second component wire) may connected to an endpiece, to which a return wire may also be connected. An endpiece may be a section of plastic or other insulating material (e.g., such as those described above), which may connect at least one wire (e.g., a component wire, return wire) to a prong or other conductive material configured to insert into a plug or otherwise electrically connect lighting apparatus 200 to a power source. In some embodiments, an endpiece may be positioned at an end (e.g., the first end) of the apparatus. In this or similar manners, the first component wire, second component wire, and return wire may attach to a common piece near a first end of lighting apparatus 200. In some embodiments, lighting apparatus 200 may include an alternating-current-to-direct-current (AC/DC) convertor, to which wires may be connected prior to an end lighting apparatus 200. By way of example, For example, the first predominantly terminal section 202*a* of the first component wire, the first predominantly terminal section 204*a* of the second component wire, and/or the first predominantly terminal section 206*a* of the return wire may electrically connect to an AC/DC convertor before connecting to an endpiece.

In some embodiments, the second predominantly terminal section 202*b* of the first component wire, the second predominantly terminal section 204*b* of the second component wire, and/or the second predominantly terminal section 206*b* of the return wire may connect near a second end of lighting apparatus 200. Wires may be connected by splicing, soldering, and/or any other method of creating an electrical connection between wires. For example, the second predominantly terminal section 204*b* of the second component wire may connect to the second predominantly terminal section 202*b* of the first component wire. The resulting combined wire (which may merely be a portion of the first component wire, past which the second component does not continue in one direction, as shown in FIG. 2), may then connect to a return wire, such as at the second predominantly terminal section 206*b* of the return wire. Either or both of these connections, as well as other connections, may exist near a second end of lighting wiring apparatus 200. Connections and nearby wiring may be coating with an insulating material (e.g., insulating material 108), consistent with disclosed embodiments.

Consistent with other disclosed embodiments, lighting apparatus 200 may include a first coated portion 208 (e.g., coated with insulating material 108) of at least one of first component wire 102, second component wire 104, and return wire 106. For example, a coated portion 208 may include at least one segment of a first component wire 102, second component wire 104, and/or return wire 106, that is coated. Lighting apparatus 200 may also include a second coated portion 210 (e.g., coated with insulating material 112) of at least one of first component wire 102, second component wire 104, return wire 106, and lighting component 110. In some embodiments, lighting apparatus 200 may include alternating and/or sequenced portions of first coated portion 208 and second coated portion 210 (as indicated in exemplary FIG. 2). Moreover, lighting apparatus 200 may include a plurality of lighting components (e.g., diodes encapsulated in second coated portions 210), which may be connected to a first component wire and a second component wire at periodic distances.

Figure 3C:
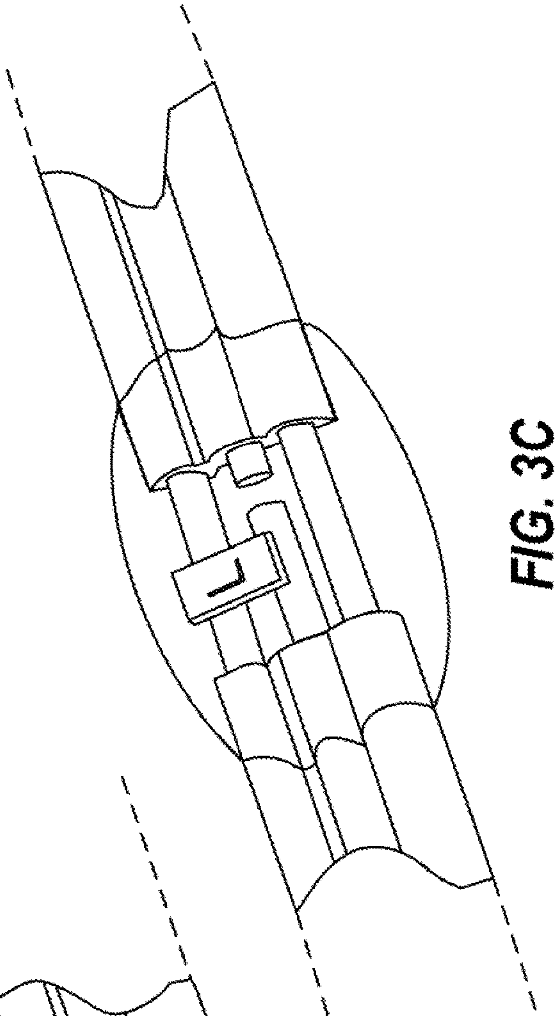
FIG. 3C illustrates an exemplary cut-away drawing of a first broken wire variant segment of a wired lighting apparatus, consistent with disclosed embodiments.
Figure 3A:
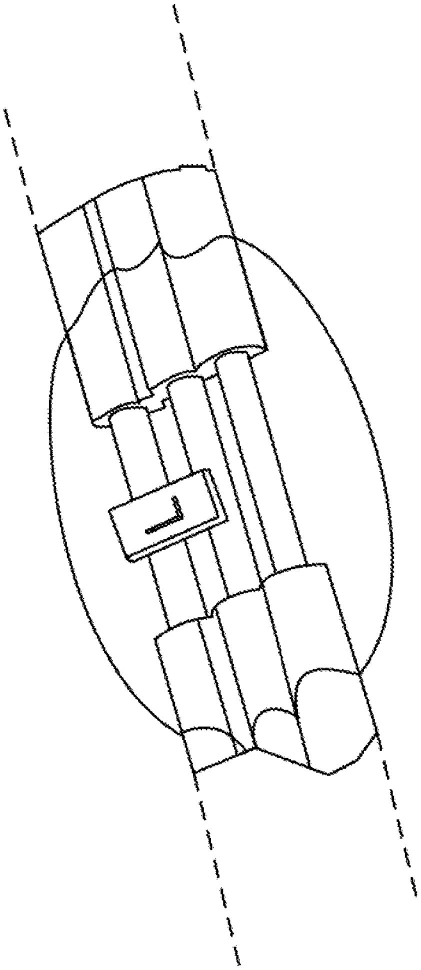
FIG. 3A illustrates an exemplary cut-away drawing of an unbroken wiring segment of a wired lighting apparatus, consistent with disclosed embodiments.
Figure 3B:
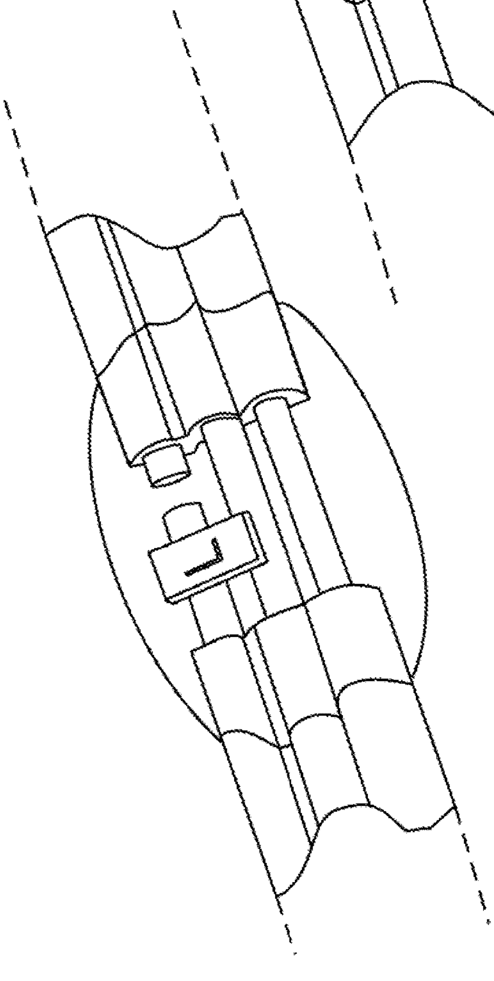
FIG. 3B illustrates an exemplary cut-away drawing of a first broken wire variant segment of a wired lighting apparatus, consistent with disclosed embodiments.

FIGS. 3A-3C illustrate exemplary cut-away drawings of various wire segments, consistent with disclosed embodiments. FIG. 3A illustrates an exemplary cut-away drawing of an unbroken wiring segment of a wired lighting apparatus, consistent with disclosed embodiments. For example, a segment (such as the segment shown in FIG. 1) may exist that has a first component wire, a second component wire, and a return wire, which may pass through a first insulator and second insulator while remaining unbroken.

FIG. 3B illustrates an exemplary cut-away drawing of a first broken wire variant segment of a wired lighting apparatus, consistent with disclosed embodiments. For example, a segment (such as the segment shown in FIG. 1) of wiring may exist that has a first component wire having a break, a second component wire not having a break, and a return wire not having a break. FIG. 3C illustrates an exemplary cut-away drawing of a first broken wire variant segment of a wired lighting apparatus, consistent with disclosed embodiments. For example, a segment (such as the segment shown in FIG. 1) of wiring may exist that has a first component wire not having a break, a second component wire having a break, and a return wire not having a break. In some embodiments (such as those shown by FIGS. 3B and 3C), a wire having a break may not conduct an electric current beyond the break unless electrical current proceeds to a different wire before returning to the wire having the break (e.g., past the point of the break while proceeding along the apparatus). In some embodiments (such as those shown by FIGS. 3B and 3C), a break may be filled by an insulating material (e.g., insulating material 112). Any or all of FIGS. 3A-3C may include aspects of other embodiments discussed herein (e.g., with respect to FIGS. 1 and 2).

Figure 4:
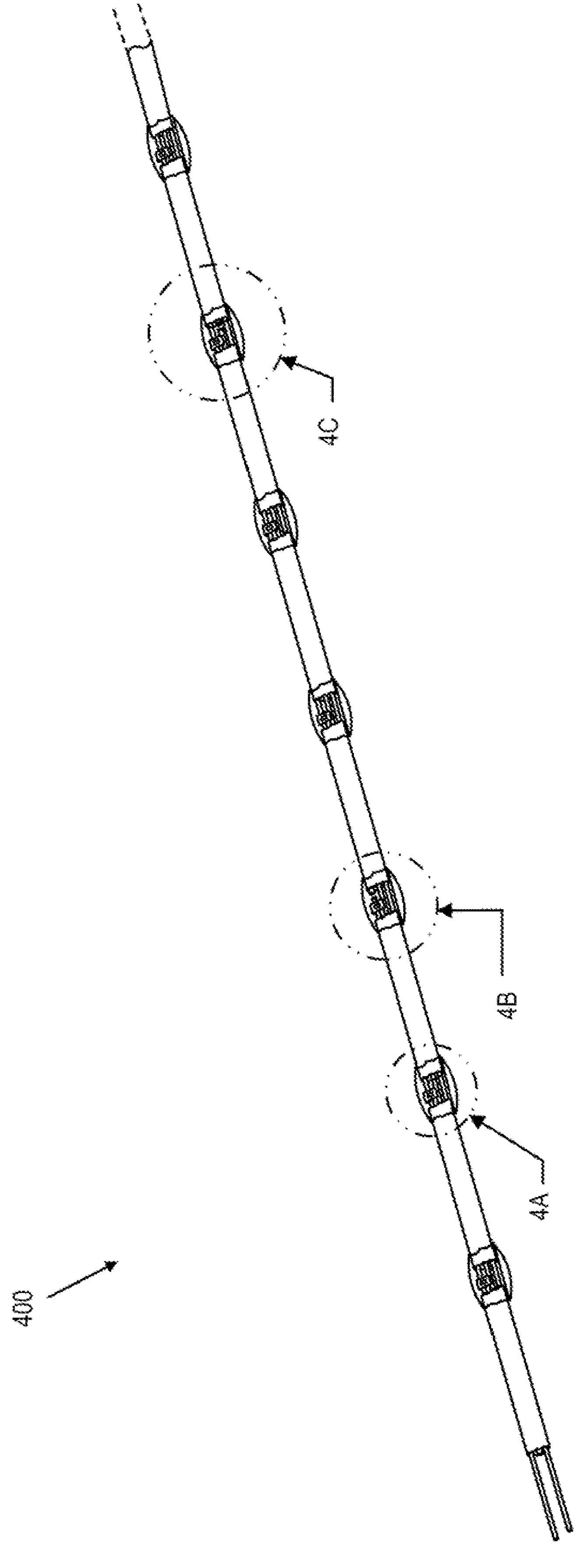
FIG. 4 illustrates an exemplary drawing of an sequenced-segment wired lighting apparatus, consistent with disclosed embodiments.

FIG. 4 illustrates an exemplary drawing of a sequenced-segment wired lighting apparatus 400, consistent with disclosed embodiments. Sequenced-segment wired lighting apparatus 400 may include any or all of other features discussed with respect to other embodiments disclosed herein (e.g., wired lighting apparatus 100, wired lighting apparatus 200, etc.). In some embodiments, sequenced-segment wired lighting apparatus 400 may include segments of wire described with respect to FIGS. 3A-3C, or any other embodiments discussed herein. For example, sequenced-segment wired lighting apparatus 400 may include a first portion 4A that includes wires having no breaks (e.g., configured according to the embodiment discussed with respect to FIG. 3A). Sequenced-segment wired lighting apparatus 400 may also include a second portion 4B that includes at least one wire (e.g., a first component wire) having a break (e.g., configured according to the embodiment discussed with respect to FIG. 3B). Sequenced-segment wired lighting apparatus 400 may also include a third portion 4C that includes at least one wire (e.g., a second component wire) having a break (e.g., configured according to the embodiment discussed with respect to FIG. 3C). In some embodiments, sequenced-segment wired lighting apparatus 400 may include multiple instances of portions 4A, 4B, and 4C, which may occur along sequenced-segment wired lighting apparatus 400 according to a pattern (e.g., a number of portions 4A, followed by a number of portions 4B, followed by a number of portions 4C). In some embodiments, sequenced-segment wired lighting apparatus 400 may include a first component wire and a second component wire, either or both of which may have a break at a periodic distance along sequenced-segment wired lighting apparatus 400. In some embodiments, sequenced-segment wired lighting apparatus 400 may include a plurality of lighting components (e.g., diodes), whose polarity changes at periodic distances along the apparatus. For example, the polarity of light components may alternate at every n-th lighting component along sequenced-segment wired lighting apparatus 400 (e.g., where n is a whole number).

Figure 5:
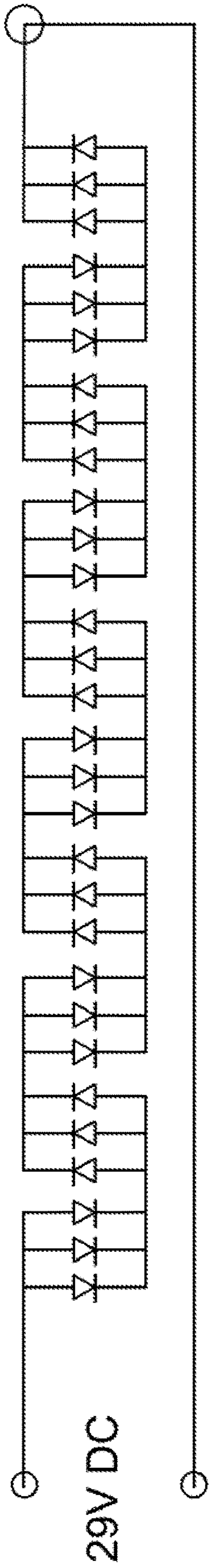
FIG. 5 illustrates an exemplary schematic drawing of a wire-and-diode lighting apparatus, consistent with disclosed embodiments.

FIG. 5 illustrates an exemplary schematic drawing of a diagram 500 of a wire-and-diode lighting apparatus, consistent with disclosed embodiments. It should be noted that while diagram 500 illustrates a power source of 29 volts of direct current, other power sources, convertors, transformers, etc. may be used, consistent with disclosed embodiments. Moreover, while diagram 500 includes typical notation for diodes, other components may be used instead (e.g., incandescent bulbs, Zener diodes, etc.). In some embodiments, a wire-and-diode lighting apparatus that follows exemplary diagram 500 or a pattern or variant of exemplary diagram 500 may be achieved by an apparatus using the techniques described above. For example, an apparatus including portions of wiring having breaks at certain places (e.g., according to FIGS. 1-4), may result in an apparatus that is consistent with diagram 500 (e.g., has groupings of lighting components, such as LEDs).

Figure 6:
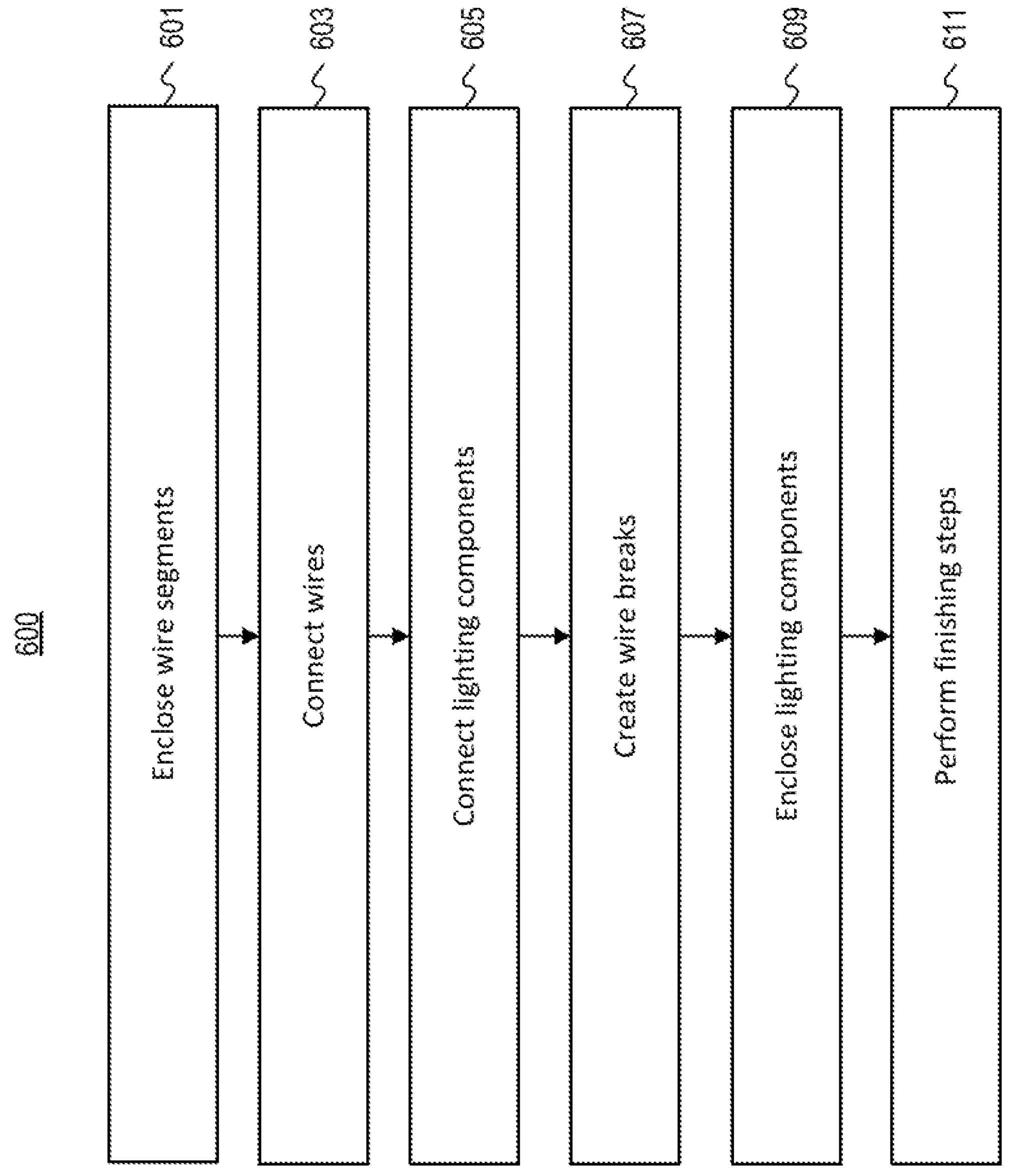
FIG. 6 depicts a flowchart of an exemplary process for creating a wired lighting apparatus lighting apparatus, consistent with disclosed embodiments.

FIG. 6 depicts a flowchart of an exemplary process 600 for creating a wired lighting apparatus, consistent with disclosed embodiments. Any or all steps of process 600 may be used to create a wired lighting apparatus (e.g., sequenced-segment wired lighting apparatus 400), consistent with disclosed embodiments. Steps of process 600 may be carried out using any of combination of: an extruder, stranding machine, covering machine, soldering machine, annealing machine, robot, a human operator, or any other tool suitable for manipulating an electrical component (including insulators, such as wire coatings), connecting electrical components, and/or enhancing durability of electrical components.

At step 601, wire segments may be enclosed. In some embodiments, a segment of a first component wire, a segment of a second component wire, and/or a segment of a third component wire may be enclosed in a first insulating material (e.g., first insulating material 108). For example, a segment of a wire may initially comprise at least one strand of conductive material (e.g., copper), which may be subsequently coated (e.g., sprayed, dipped, placed into a mold with, etc.) with an insulating material. In some embodiments, some segments of a wire may be coated and other segments may be left uncoated (e.g., due to masking). Alternatively or additionally, an unbroken wire may be nearly completely coated in an insulating material and may have portions of the insulating material removed (e.g., stripped), which may create exposed (e.g., uncoated) portions of wire (e.g., at which a wire break may be created, to which a lighting component may be attached, etc.). In some embodiments, segments of wire may be uncovered (e.g., uncoated) at periodic distances along a wire. In some embodiments, a wire to which process 600 is applied may have a first predominantly terminal section and a second predominantly terminal section, consistent with disclosed embodiments. In some embodiments, a wire may be cut from a larger source wire (e.g., a spooled wire) according to a predetermined length, which may be based on a product for which a lighting wiring apparatus is intended (e.g., an artificial tree with lighting).

At step 603, wires may be connected. For example, the first predominantly terminal section of the first component wire may be connected to the first predominantly terminal section of the second component wire, the second predominantly terminal section of the first component wire may be connected to the second predominantly terminal section of the second component wire, and/or the second predominantly terminal section of the first component wire may be connected to the second predominantly terminal section of the return wire. Wires may be connected by splicing, soldering, and/or any other method of creating an electrical connection between wires. In some embodiments, materials aside from the wires themselves may be used to connect the wires (e.g., solder, additional wire, etc.). In some embodiments, after a connection has been made between two wire segments, those segments may be coated (e.g., with a first insulating material 108, as described above).

At step 605, lighting components may be connected. In some embodiments, segments of a wire or wires (e.g., a first component wire, a second component wire, a return wire) may be exposed, such as due to lack of coating, which may have been removed, and lighting components may be connected to these segments of a wire. For example, at least one lighting component (e.g., diode) may be connect to at least one unenclosed segments of a first component wire and at least one unenclosed segments of a second component wire. A lighting component may be a diode (including an LED), incandescent bulb, or any of the other lighting components discussed herein. In some embodiments, the lighting components may be connected to a wire by soldering and/or using SMT. In some embodiments, lighting components may be connected at periodic distances along a wire or apparatus (e.g., according to periodic uncovered portions of wire, according to a schematic describing an apparatus, etc.).

At step 607, wire breaks may be created. Wire breaks, consistent with disclosed embodiments, may be created by cutting a wire, twisting a wire, damaging a wire, removing a portion of a wire (e.g., by cutting the wire twice), or by any technique capable of preventing electrical current from proceeding past a point on a wire. It should be noted that a break does not necessarily prevent current from returning to the same conceptual wire. By way of example, a first component wire may have multiple (e.g., periodic) breaks, thus creating multiple first component wire segments delineated by the breaks, segments which may be considered the same conceptual wire due to these segments having a similar position relative to other wires or wire segments while proceeding along the length of a lighting wiring apparatus. Of course, other types of segments of wires may be delineated as well (e.g., coated vs. uncoated segments, encapsulated vs. unencapsulated segments), where the delineation may be different from a wire break delineation. In some embodiments, wire breaks may be created along a first component wire, a second component wire, and/or a return wire. In some embodiments, creating breaks may occur on the first and second component wires at periodic distances along those wires or along an apparatus.

At step 609, lighting components may be enclosed. For example, at least one lighting component may be enclosed with an insulating material (e.g., second insulating material 112). In some embodiments, an unenclosed segment of a wire at which or near which a lighting component is connected may also be enclosed with an insulating material (e.g., insulating material 112). Insulating material may be an epoxy, thermoset plastic, or any material described with respect to insulating material 112.

At step 611, at least one finishing step may be performed. For example, wire segments may be connected to an AC/DC convertor. As another example, wire segments may be connected to an endpiece for inserting into a wall outlet (or otherwise connecting to a power source). In some embodiments, a colored paint or additional coating (e.g., protective coating) may be applied to all or a portion of the wired lighting apparatus. In some embodiments, the wired lighting apparatus may be connected to a power source, to perform a quality check on the light output from lighting components of the apparatus. In some embodiments, It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways. For example, aspects related to components, configurations, and/or methods described with respect to a figure, apparatus, or method, may be combined with those of others.

For example, while some embodiments are discussed in a context involving lighting applications, these elements need not be present in each embodiment. For example, components other than light-emitting diodes may be connecting according to the disclosed embodiments. In other variations, light-emitting diodes may be interconnected together with other kinds of electric components (resistors, inductors, other types of diodes, capacitors, etc.). Such variations are fully within the scope and spirit of the described embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus comprising:

a first component wire having first and second terminal sections and a plurality of first breaks providing a plurality of first segments;

a second component wire having first and second terminal sections and a plurality of first breaks providing a plurality of first segments;

a return wire defining first and second terminal sections;

a plurality of light sources connected to the first component wire and the second component wire at connection points disposed at periodic distances;

an at least partially translucent insulating thermoset polymer; and a substantially opaque insulating material, wherein:

the first terminal section of the first component wire is electrically connected to the first terminal section of the second component wire the second terminal sections of the first component wire, the second component wire, and the return wire are electrically connected, the plurality of light sources are coated with the insulating thermoset polymer, the first breaks are filled by first portions of the insulating thermoset polymer, the second breaks are filled by second portions of the insulating thermoset polymer separate from the first portions, and the first component wire, the second component wire, and the return wire are coated with the substantially opaque insulating material in segments not including the connection points.

2. The apparatus of claim 1, wherein:

at least two of the light sources are coated in separate portions of the insulating thermoset polymer;

at least another two of the light sources are coated by a same portion of the insulating thermoset polymer, wherein the at least another two diodes are configured to emit different colors of light.

3. The apparatus of claim 1, wherein the insulating thermoset polymer comprises multiple layers of different materials.

4. The apparatus of claim 1, wherein the insulating thermoset polymer is tinted to alter a wavelength of light emitted from the plurality of light sources.

5. The apparatus of claim 1, wherein the opaque insulating material is a polyvinyl chloride (PVC) wire jacket.

6. The apparatus of claim 1, wherein the first component wire, the second component wire, the return wire, and the plurality of light sources are configured to conduct electric current produced by an input voltage of approximately 29 volts of direct current.

7. The apparatus of claim 1, wherein the apparatus further comprises an endpiece connected to the first component wire, the second component wire, and the return wire near the first terminal sections, and the endpiece is configured for connection to a wall outlet.

8. The apparatus of claim 1, further comprising an alternating-current-to-direct-current (AC/DC) convertor.

9. The apparatus of claim 1, wherein the light sources are light-emitting diodes (LEDs).

10. The apparatus of claim 9, wherein the light-emitting diodes are surface mount technology (SMT) LEDs.

11. The apparatus of claim 9, wherein a polarity of the light-emitting diodes changes at periodic distances along the apparatus.

12. The apparatus of claim 1, wherein the substantially opaque insulating material is formed to have three connected channels that carry the first component wire, the second component wire, and the return wire.

13. The apparatus of claim 12, wherein the insulating thermoset polymer is flexible.

14. The apparatus of claim 12, wherein the substantially opaque insulating material flexible.

15. The apparatus of claim 14, wherein the substantially opaque insulating material is green.

* * * * *